A. WUNDERLICH.
DEVICE FOR MEASURING AND REGISTERING FLUIDS.
APPLICATION FILED AUG. 22, 1919.
1,331,552.
Patented Feb. 24, 1920.
2 SHEETS—SHEET 2.
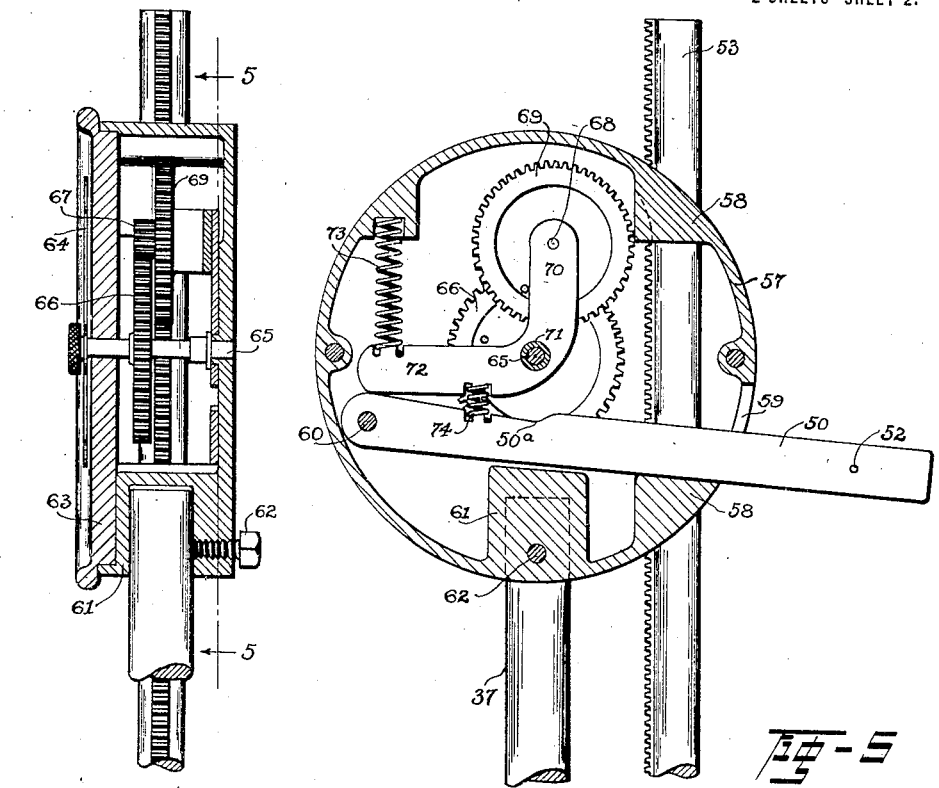
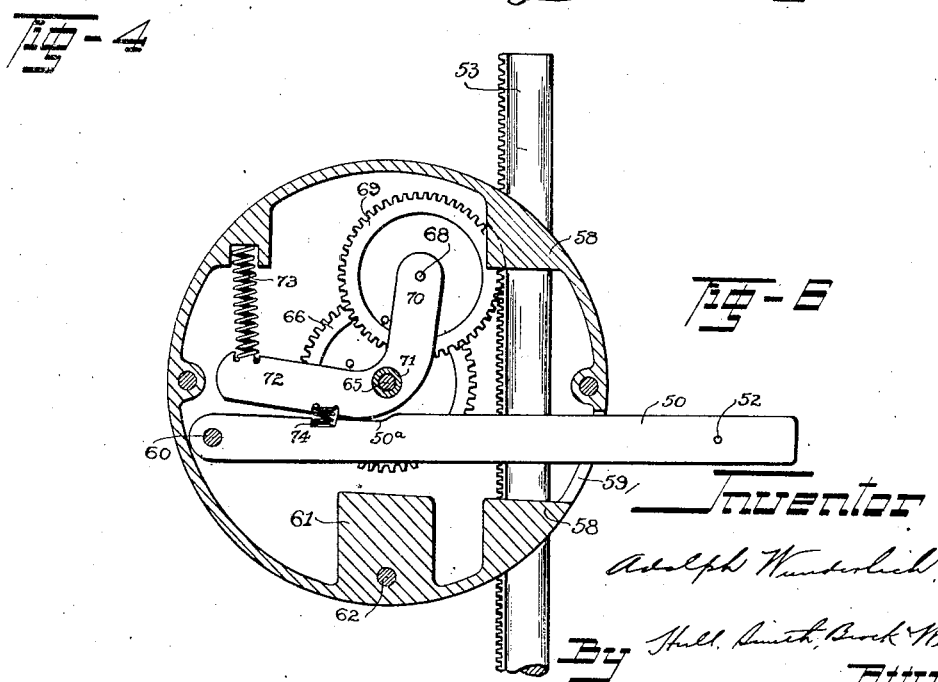

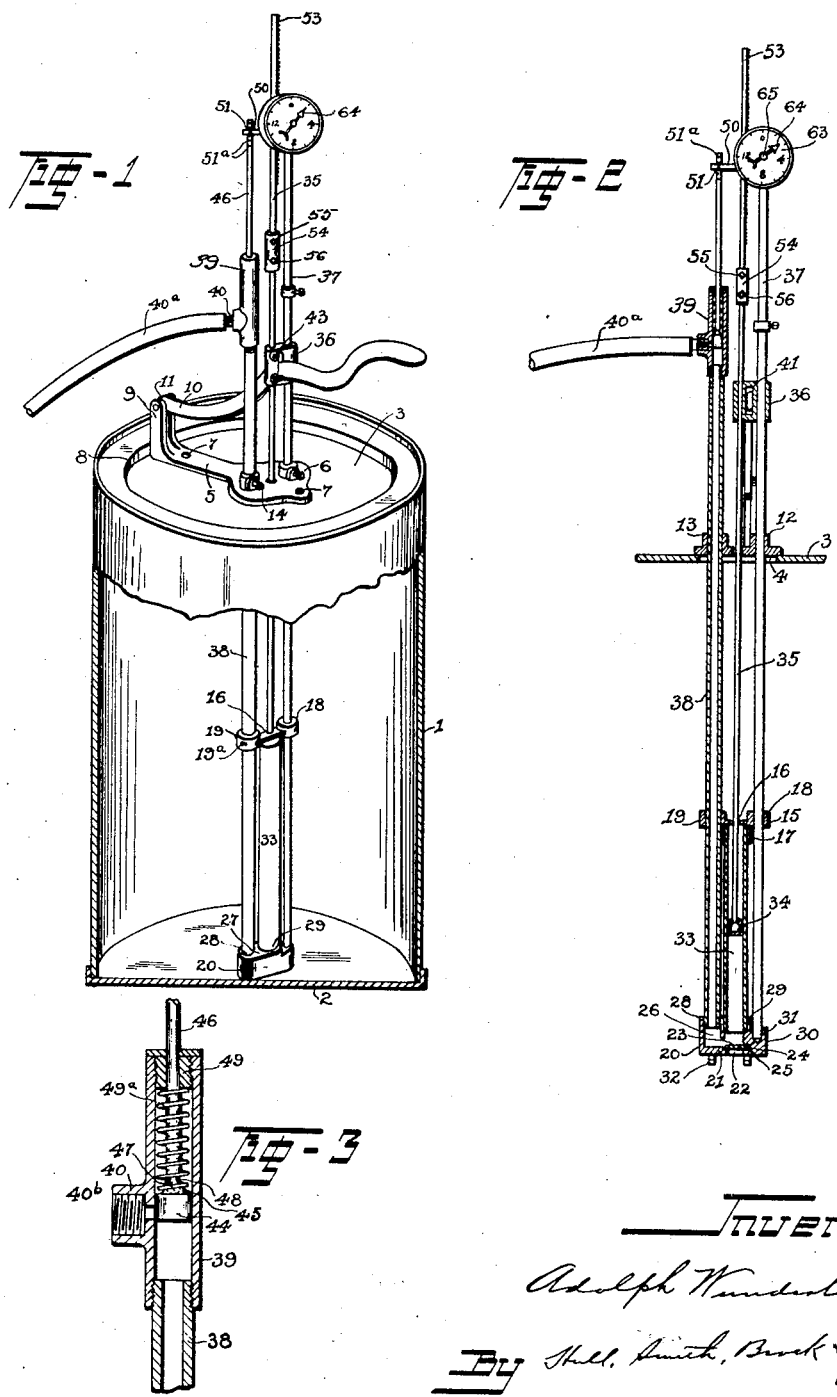

UNITED STATES PATENT OFFICE.

ADOLPH WUNDERLICH, OF CLEVELAND, OHIO, ASSIGNOR TO EDSON L. CANNON, OF CLEVELAND HEIGHTS, OHIO.

DEVICE FOR MEASURING AND REGISTERING FLUIDS.

1,331,552. Specification of Letters Patent. Patented Feb. 24, 1920.

Application filed August 22, 1919. Serial No. 319,051.

*To all whom it may concern:*

Be it known that I, ADOLPH WUNDERLICH, a citizen of the United States, residing at Cleveland, in the county of Cuyahoga and State of Ohio, have invented a certain new and useful Improvement in Devices for Measuring and Registering Fluids, of which the following is a full, clear, and exact description, reference being had to the accompanying drawings.

This invention relates to measuring devices and more particularly to devices for measuring and registering the amount of liquids delivered by pumps. The general object of the invention is to provide a device of this character which is efficient and accurate in operation. More limitedly, my invention consists in so constructing a device of this character and so combining the same with a pump or other movable dispensing device that there can be no operation of the registering mechanism until actual delivery of the liquid begins, thus making the registering device independent of any lost motion which may occur during the delivery stroke of the pump plunger or the delivery movement of the said device. A further object of the invention is to provide a new construction and arrangement of registering device. I accomplish the foregoing objects in and through the construction illustrated in the drawings forming part hereof, wherein Figure 1 represents a view, partly in section and partly in elevation, of a barrel or similar receptacle having a pump therein to which my registering device is applied; Fig. 2 a vertical sectional view through certain parts of the pump and through the head of the receptacle, the registering mechanism and some of the parts of the pump being shown in elevation; Fig. 3 a sectional detail of a portion of the delivery pipe showing in elevation the plunger and the connecting rod for operating the registering device; Fig. 4 a vertical sectional view through the registering device; and Figs. 5 and 6 sectional views corresponding to the line 5—5 of Fig. 4 and showing the parts of the registering device in inoperative and operative relation, respectively, to the plunger rod of the pump.

The pump shown herein is of a type designed for the dispensing of grease from barrels or similar receptacles and, as shown, is of the type disclosed in the application of Edson L. Cannon Serial No. 258,946, filed October 21, 1918.

Describing the parts by reference characters, 1 denotes a receptacle, shown as a metallic barrel having a lower head 2 and an upper head 3. The last mentioned head is provided with an aperture 4 for the reception of certain parts of the pump structure which are to be mounted within the barrel.

On top of the upper head 3 is a supporting base comprising an elongated plate 5 having a disk portion 6 adapted to cover the aperture 4, the plate being secured to the top of the barrel, as by means of screws 7. The plate extends from the central portion of the barrel toward the chime 8, where it is provided with a pair of upwardly extending lugs 9 between the upper ends of which is pivoted one end of the pump handle lever 10, the pivotal connection being indicated at 11. The parts 5, 6 and 9 may be made as a casting and the disk 6 is provided with a pair of upwardly extending hollow projections or bosses 12 and 13, each projection being provided with a set screw, one of which is indicated at 14. The central portion of the disk 6 is provided with an aperture 6ª, intermediate the projections 12 and 13 for a purpose to be described hereinafter.

The pump which is shown herein as employed in conjunction with the foregoing parts will now be described. 15 denotes a cap member, which may be conveniently made as a casting comprising a central plate 16 having a depending circular skirt or flange 17 and hollow lugs 18 and 19 on opposite sides of such central plate. When the pump is assembled, these lugs and the openings therethrough will aline respectively with the projections 12 and 13 and the openings therethrough. Each lug 18, 19 is provided with a set screw, one of which is indicated at 19ª.

Beneath the cap member 15 is a casing member 20, which may also be formed as a casting, said casing member having in the bottom wall 21 thereof an inlet opening 22 controlled by an inwardly opening valve 23 pivoted at one side of said opening 22, as by means of a rod 24 extending through a pivot lug 25 on the valve and mounted in the walls of the casing member. Above the bottom plate 21 is a chamber 26. The top of the chamber is provided with a cover portion 27 provided with cylindrical seats 28 and 29 alining respectively with the aperture through the lug 19 and with the downwardly extending circular flange 17. Both of the seats 28 and 29 are located above the chamber 26, the seat 29 being directly above the aperture 22 and valve 23. At one side of the chamber 26, the casing member 20 is provided with an extension 30 having a cylindrical seat 31 in alinement with the aperture through the lug 18 thereabove. From the bottom 21 of the casing member a pair of feet 32 extend downwardly, said feet serving to support the pump assembly upon the lower head 2 of the barrel and permit the access of grease to the chamber 26 through the valve 22.

33 denotes a pump cylinder which is secured within the flange 17 and the seat 29. Within this cylinder is the piston 34, the operating or plunger rod 35 for which extends through the apertures 16, 4 and 15, the upper end of the rod being secured to a connecting member 36 which is slidably mounted upon a guide rod 37 extending from above the head 3 through the hollow projections 12 and 18, with its lower end secured within the seat 31. A delivery pipe 38 extends through the hollow projections 13 and 19 and is secured at its lower end within the seat 28. By means of the set screws 14 and 19$^a$, the guide rod 37 and the delivery pipe 38 may be secured firmly to the disk 6 and the cap member 15, the securing means also serving to anchor the pump proper within the barrel. The delivery pipe 38 is shown as provided with a T 39 from the delivery branch 40 thereof there extends a delivery connection 40$^a$.

The connection 36 is provided with a slot 41, located between the top and bottom thereof and the lateral portions coöperating with the rods 35 and 37. The connecting member 36 is shown as secured to the plunger 35 by means of set screws 43.

During the lifting stroke of the handle lever 10, the piston 34 is elevated, thereby drawing in the grease, or other liquid, through the valve 23 until the cylinder is filled. By pressing the handle down, the valve 23 will be closed and an amount of grease or other liquid, equal to the contents of the cylinder, will be delivered to the pipe 38. After a column of liquid has been established from the casing 20 to the outlet 40$^b$, the registering device will operate to indicate the quantity of such liquid delivered thereafter through said outlet.

The registering device is shown as constructed and operating as follows:—

Within the vertical chamber or through-passage of the T 39 is mounted a plunger 44. This plunger is connected, by means of a hemispherical cap 45 and an opening in the top thereof, with the lower end of a plunger rod 46 having a ball 47 formed on the bottom thereof and connected to the rod by a neck 48 which extends through the said opening. The rod 46 extends through a plug 49 threaded into the top of the T and is connected at its upper end to an arm 50 by means of a pin 51 extending through two alined apertures 51$^a$ in the forked upper end of said rod and through an aperture 52 in said arm 50. To insure an accurate connection between the top of the rod 46 and the arm 50, the forks at the upper end of said rod are shown as provided with a plurality of alined apertures 51$^a$.

Surrounding the lower end of the plunger rod 46 and interposed between the plug 49 and the plunger 44 is a helical spring 49$^a$ which tends to hold the plunger with its lower end at the bottom of the delivery port 40$^b$ leading from the T 39.

The upper end of the plunger rod 35 is extended and formed into a rack, indicated at 53. Where the rack is not formed as an integral part of the plunger rod, it may be secured thereto as by means of a sleeve 54 and set screws 55, 56, connected respectively to the lower end of the rack and to the upper end of the plunger rod. This rack extends through the cylindrical casing 57 of the indicating device proper, being mounted in guide bosses 58 formed in said wall. The arm 50 projects through a slot 59 in said casing, being pivoted within the casing at one side thereof, as indicated at 60. The casing 57 is conveniently supported on top of the rod 37, being provided with a hollow boss 61 within which the upper end of said rod is screwed, as by means of a screw 62. The front of the casing 57 is provided with a front plate 63 constituting a dial having thereon numerals indicating the quantity of liquid dispensed by the pump through the outlet 40$^b$. Coöperating with the said numerals is a pointer 64 mounted on a shaft 65, the said shaft being mounted within the front and back plates of the casing. This shaft is provided with a gear 66 rigidly connected thereto, said gear meshing with a pinion 67 mounted on a shaft 68 on which there is also mounted a gear 69. The shaft 68 is carried by one arm 70 of an angle lever which is pivoted upon the shaft 65, as by means of a hub 71. The end of the other arm 72 of said lever bears against the arm 50, being held in engagement therewith by a spring 73. The edge of the arm 50 which is presented toward the lever arm 72 is recessed, as shown at 50ª, and a short spring 74 is interposed between the arms 50 and 72.

By the arrangement and construction described, when the arm 50 is depressed, the gear 69 will be maintained out of driving contact with the rack 53. The bottom of the plunger 49 is then substantially even with the bottom of the port 40ᵇ, being sustained in this position by the column of liquid in the pipe 38. When the operator moves the lever handle 10 upwardly, grease or other liquid will be drawn into the cylinder 33, filling the same. After the first few strokes, a column of liquid will extend from the chamber 20 up to the bottom of the plunger 44. Thereafter, when the handle lever 10 is depressed, the grease expelled from the cylinder and the chamber 26 will elevate the plunger, thereby lifting the arm 54 and rocking the gear 69 into engagement with the rack 53. A driving connection will then be established between the pump plunger rod and the indicating finger 64 during the power stroke of the pump, but the shaft 65 will not be rotated and the finger moved until grease is actually being delivered through the port 40ᵇ. Thus, should there be any lost motion of the pump plunger during its power stroke, the indicator will take no account thereof, as the arm 50 will not be rocked to bring the gear 69 into engagement with the rack until the plunger 44 is elevated. On the upstroke of the lever handle 10, the spring 49ª will tend to depress the plunger to its initial position; i. e. the position which it occupied at the end of the preceding operation, further descent being prevented by the column of liquid between the port 40ᵇ and the pump chamber valve. At the end of the pumping operation, the parts of the indicator will be in the positions shown in Fig. 5.

Having thus described my invention, what I claim is:—

1. The combination with a fluid supply conduit and means for forcing fluid therethrough, of an indicating device, and means operable conjointly by the forcing means and the fluid flowing through said conduit for operating said device.

2. The combination, with a pump comprising a plunger rod, a plunger, a cylinder for said plunger, and a delivery pipe having an outlet, of an indicating device, and means operable conjointly through the power stroke of said plunger rod and the supply of fluid to said outlet for operating said device.

3. The combination, with a liquid forcing mechanism comprising a reciprocable member and a delivery pipe having a lateral outlet and an extension above said outlet of a plunger reciprocable in said extension, an indicating device, and means operable by the power stroke of said member on the movement of said plunger for operating said device.

4. The combination, with a pump comprising a reciprocable member and a delivery pipe having an outlet and an extension above said outlet of a plunger operable in said extension, an indicating device comprising a pointer, a shaft for said pointer and a gear on said shaft, a rack connected with the reciprocable member, an angle lever pivoted on said shaft, a gear mounted on one of the arms of said lever, a pinion rotatable with the last mentioned gear and meshing with the first-mentioned gear, a lever arm adapted to engage the arm of the angle lever opposite that on which the second mentioned gear is mounted, and a connection between the plunger and the said lever arm.

5. The combination, with a pump comprising a reciprocable member and a delivery pipe having an outlet and an extension above said outlet, of a plunger reciprocable in said extension, an indicating device comprising a pointer, a shaft for said pointer and a gear on said shaft, a rack connected with said member, an angle lever pivoted on said shaft, a gear mounted on one of the arms of said lever, a pinion rotatable with the last mentioned gear and meshing with the first mentioned gear, a lever arm adapted to engage the arm of the angle lever opposite that on which the second mentioned gear is mounted, a spring tending to press the last mentioned angle lever arm into engagement with the said lever, and a spring interposed between said lever arm and said angle lever between the pivotal support and the first mentioned spring.

6. The combination, with a pump having a reciprocable member and a delivery pipe having a lateral discharge outlet and an extension beyond said outlet, of a plunger adapted to move across said outlet and into said extension, an indicating device, means connected with said member for operating said device, and means connected with said plunger and operated by the movement thereof by fluid supplied to said outlet for operating said device.

7. The combination, with a liquid forcing mechanism comprising a reciprocable member and a delivery pipe having a lateral outlet and an extension beyond said outlet, of a plunger adapted to move across said outlet and in said extension, a spring within said extension tending to hold the plunger in operative relation to said outlet, an indicating device comprising a pointer, a shaft for said pointer and a gear on said shaft, a rack connected with the said member, a gear movable toward and from said rack and adapted to transmit power from said rack to the first mentioned gear, and means operable from the plunger for shifting the second gear.

8. The combination, with a pump comprising a reciprocable member and a delivery pipe, of an indicator, connections between said member and said indicator for operating the latter on the power stroke of said member, and means operable by the delivery of liquid through said pipe for operating said indicator.

In testimony whereof I hereunto affix my signature.

ADOLPH WUNDERLICH.